United States Patent
Shirazipour et al.

(10) Patent No.: US 9,203,764 B2
(45) Date of Patent: Dec. 1, 2015

(54) QUALITY OF EXPERIENCE ENHANCEMENT THROUGH FEEDBACK FOR ADJUSTING THE QUALITY OF SERVICE IN COMMUNICATION NETWORKS

(71) Applicants: Meral Shirazipour, San Jose, CA (US); Suresh Krishnan, Montreal (CA); Gregory Charlot, Montreal (CA)

(72) Inventors: Meral Shirazipour, San Jose, CA (US); Suresh Krishnan, Montreal (CA); Gregory Charlot, Montreal (CA)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 88 days.

(21) Appl. No.: 13/628,956

(22) Filed: Sep. 27, 2012

(65) Prior Publication Data

US 2014/0016464 A1 Jan. 16, 2014

Related U.S. Application Data

(60) Provisional application No. 61/670,358, filed on Jul. 11, 2012.

(51) Int. Cl.
*H04L 12/28* (2006.01)
*H04L 12/851* (2013.01)
(Continued)

(52) U.S. Cl.
CPC .............. *H04L 47/24* (2013.01); *H04L 47/11* (2013.01); *H04L 47/26* (2013.01)

(58) Field of Classification Search
CPC ..... H04L 12/56; H04L 2012/56; H04L 47/24; H04L 47/70; H04L 2012/5679; H04L 47/50; H04L 47/6225; H04L 47/805; H04L 47/625; H04L 47/11; H04L 47/26
USPC ............ 370/389, 395.21, 395.4, 395.42, 235, 370/395.41, 429, 349
See application file for complete search history.

(56) References Cited

U.S. PATENT DOCUMENTS

2005/0089043 A1 4/2005 Seckin et al.
2007/0047640 A1* 3/2007 Venna et al. .............. 375/240.01
(Continued)

FOREIGN PATENT DOCUMENTS

WO 2012/058781 A1 5/2012

OTHER PUBLICATIONS

Vlado Menkovski et al., Online QoE Prediction, Proceedings of the 2010 Second International Workshop on Quality of Multimedia Experience (QOMEX 2010), Trondheim, Norway, IEEE, Piscataway, NJ, USA, Jun. 21, 2010, pp. 118-123.
(Continued)

*Primary Examiner* — Brenda H Pham

(57) ABSTRACT

A method of enhancing Quality of Experience (QoE) associated with an application flow for an end-user in a communication network comprises: receiving a packet belonging to the application flow, the packet comprising QoE information determined based on previous packets exchanged within the application flow; decoding the QoE information from the received packet; and adjusting a QoS mechanism for the packet, based on the decoded QoE information for enhancing the QoE of the application flow. A network node for carrying out this method is disclosed. Also, a method for relaying QoE associated with an application flow for an end-user in a communication network comprises: receiving packets belonging to the application flow; calculating QoE information based on the received packets; and sending the calculated QoE information back to the communication network, the QoE information being included in a packet belonging to the application flow. A network node for carrying out this method is disclosed.

22 Claims, 5 Drawing Sheets

(51) Int. Cl.
*H04L 12/801* (2013.01)
*H04L 12/825* (2013.01)

(56) References Cited

U.S. PATENT DOCUMENTS

2007/0239820 A1    10/2007  Zhong et al.
2008/0056273 A1*    3/2008  Pelletier et al. .......... 370/395.21
2010/0268524 A1    10/2010  Nath et al.
2011/0211464 A1     9/2011  Chetlur et al.
2012/0051216 A1*    3/2012  Zhang et al. .................. 370/230
2013/0223208 A1*    8/2013  Liao et al. ..................... 370/229

OTHER PUBLICATIONS

Moura N T et al., MOS-Based Rate Adaption for VoIP Sources, Proceedings of the 2007 IEEE International Conference on Communications (ICC 2007), Jun. 24-28, 2007, Glasgow, UK, IEEE, Piscataway, NJ, USA, Jun. 1, 2007, pp. 628-633.

International Search Report from corresponding application PCT/IB2013/055718.

B. Briscoe et al., Re-ECN: Adding Accountability for Causing Congestion to TCP/IP, Transport Area Working Group, Internet Draft, Oct. 25, 2010, pp. 1-50.

S. Krishnan et al., IPv6 Destination Option for Conex, Conex Working Group, Internet Draft, Oct. 30, 2011, pp. 1-7.

S. Deering et al., Internet Protocol, Version 6 (IPv6) Specification, Network Working Group, RFC 2460, Dec. 1998, pp. 1-39.

ITU-T, G.107, Series G: Transmission Systems and Media, Digital Systems and Networks, International telephone connections and circuits—Transmission planning and the E-model, The E-model: a computational model for use in transmission planning, Apr. 2009, pp. 1-28.

Congestion Exposure-Charter-ietf-conex-01, Jun. 3, 2010, pp. 1-2.

Zizhi Qiao et al., A new method for VoIP Quality of Service control use combined adaptive sender rate and priority marking, IEEE Communications Society, 2004, pp. 1473-1477.

B. Briscoe et al., Congestion Exposure (ConEx) Concepts and Use Cases, IETF, RFC 6789, Dec. 2012, pp. 1-17.

Hai Anh Tran et al., User to User adaptive routing based on QoE, IEEE 2011, pp. 1-7.

S. Krishnan et al., A Uniform Format for IPv6 Extension Headers, IETF, RFC 6564, Apr. 2012, pp. 1-6.

S. Krishnan et al., IPv6 Destination Option for Conex, Conex Working Group, Internet Draft, Mar. 12, 2012, pp. 1-8.

T. Friedman et al., RTP Control Protocol Extended Reports (RTCP XR), Network Working Group, RFC 3611, Nov. 2003, pp. 1-55.

* cited by examiner

QUALITY OF EXPERIENCE ENHANCEMENT THROUGH FEEDBACK FOR ADJUSTING THE QUALITY OF SERVICE IN COMMUNICATION NETWORKS

PRIORITY STATEMENT UNDER 35 U.S.C. S.119(E) & 37 C.F.R. S.1.78

This non-provisional patent application claims priority based upon the prior U.S. provisional patent application entitled "QUALITY OF EXPERIENCE ENHANCEMENT THROUGH A FEEDBACK FOR ADJUSTING THE QUALITY OF SERVICE IN COMMUNICATION NETWORKS", application No. 61/670,358, filed Jul. 11, 2012, in the names of Meral Shirazipour, Suresh Krishnan and Gregory Charlot.

TECHNICAL FIELD

The disclosure generally relates to communication networks and, more particularly, to a method and a network node for improving the quality of the communications in the networks.

BACKGROUND

Quality of Experience (QoE) may be seen as a measure of how satisfied end-users are of a communication service or application running in a communication network. In other words, the QoE defines the quality perceived by the end-users of applications and communication services. Although QoE is historically a subjective value, there exist standardized methods to objectively estimate QoE based on the Quality of Service (QoS) parameters of the network. Indeed, the QoE is, in general, greatly impacted by the quality of the network services, themselves being measured by the QoS parameters. The QoS generally represents the performance of the communication network and the QoS parameters provide an objective measure of the quality of the network's services, in terms of transport of Internet Procotol (IP) packets, for example. In general, five parameters are used to evaluate the QoS of a network, such as bandwidth, delay, jitter, packet loss and availability. Depending on the application, a set of these parameters will have specific threshold values that need to be met in order to ensure an acceptable quality for the end-users.

Many QoE measurement techniques exist for voice, video, real-time and web applications, etc. Most objective QoE calculation methods are derived from QoS parameters. The QoE is usually a byproduct of the QoS, meaning that one way to change the QoE is to change (or enhance) the QoS. For example, in order to enhance the QoE, network operators usually concentrate on the QoS, which is easier to monitor and control. Typical QoS enhancing mechanisms are either traffic conditioning or related to traffic queuing and scheduling. Traffic conditioning includes metering, classification, marking, shaping and policing. Queuing and scheduling algorithms include round-robin, first in first out, priority queuing, etc.

In current systems, no efficient methods are available to dynamically enhance the QoS for a given data flow in response to QoE. Usually, the same QoS is requested for all the data flows belonging to a given QoS class. However, the different data flows in the same QoS class experience different source-destination paths and thus have a different QoE perceived by the end-users. This is a problem that could, to the least, lead to resource wastage (e.g. QoS overprovisioning), because not all the data flows in the given QoS class need the same level of QoS in order to achieve an acceptable QoE or the same level of QoE.

In N. T. Moura, B. A. Vianna, C. V. N. Albuquerque, V. E. F. Rebello, and C. Boeres, "*MOS-based rate adaption for VoIP sources*" (in ICC'07, IEEE International Conference on Communications, pages 628-633, June 2007), and Q. Zizhi, S. Lingfen, N. Heilemann, and E. Ifeachor: "*A new method for VoIP quality of service control use combined adapative sender rate and priority making*" (in ICC'04, IEEE International Conference on Communications, 3:1473-1477, June 2004), a method for QoS control using a QoE feedback, which is used to vary the codec's bitrate in a voice call, is disclosed. The QoE information is used by the end-systems.

In the Real-Time Transport Protocol (RTP), the RTP control protocol (RTCP) is an application layer protocol which controls the RTP streams. It periodically transmits information about the characteristics of an RTP session and the QoS. This protocol uses out-of-band signaling, which brings scalability and synchronization challenges on the current networks.

The above solutions for providing a QoE feedback are for layers above the IP layer, such as the application layer. As such, they mostly are usable by end-nodes only.

Therefore, there is a need to better correlate QoS with QoE for a given data or application flow.

SUMMARY

More specifically, in accordance with the present invention, there is provided a method of enhancing Quality of Experience (QoE) associated with an application flow for an end-user in a communication network. The method comprises: receiving a data packet belonging to the application flow, at a communication interface of a network node, the packet comprising QoE information determined based on previous packets exchanged within the application flow; decoding the QoE information from the received packet by a processor of the network node; and adjusting a QoS mechanism for the packet, based on the decoded QoE information for enhancing the QoE of the application flow.

According to a second aspect of the present invention, there is provided a network node for enhancing QoE associated with an application flow for an end-user in a communication network. The network node comprises: a communication interface for receiving a packet belonging to the application flow, the packet comprising QoE information determined based on previous packets exchanged within the application flow; and a processor operationally connected to the communication interface and configured to decode the QoE information from the received packet and adjust a QoS mechanism for the packet, based on the decoded QoE information for enhancing the QoE of the application flow.

According to a third aspect of the present invention, there is further provided a method for relaying Quality of Experience (QoE) associated with an application flow for an end-user in a communication network. The method comprises: receiving packets belonging to the application flow; calculating QoE information based on the received packets; and sending the calculated QoE information back to the communication network, the QoE information being included in a packet belonging to the application flow.

According to a fourth aspect of the present invention, there is provided a network node for relaying Quality of Experience (QoE) associated with an application flow for an end-user in a communication network. The network node comprises: a communication interface for receiving packets belonging to the application flow; and a processor operationally connected to the communication interface for calculating QoE information based on the received packets; and where the communication interface further sends the calculated QoE information back to the communication network, the QoE information being included in a packet belonging to the application flow.

BRIEF DESCRIPTION OF THE DRAWINGS

Embodiments of the present invention will now be described, by way of example only, with reference to the attached Figures, wherein.

DETAILED DESCRIPTION

Figure 1:
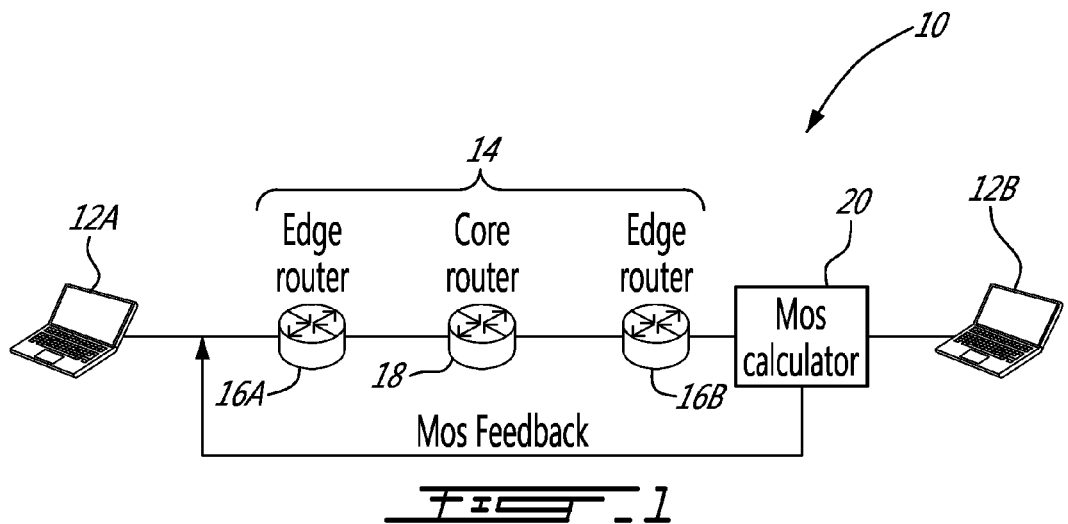
FIG. 1 is a schematic view of a communication network having QoE information feedback, according to an embodiment of the present invention.

Embodiments of the present invention are directed to a network node and a method for providing QoE feedback, in-band, in a communication network. The QoE feedback is used to adjust the QoS of a data or application flow, in order to maintain the QoE associated with the application flow at an acceptable level for the end-users. By providing the QoE feedback in-band, meaning that the QoE information is encoded within an IP data packet belonging to the data flow, additional signaling is prevented, as will be described in more detail hereinbelow.

Reference may be made below to specific elements, numbered in accordance with the attached figures. The discussion below should be understood to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

As mentioned hereinabove, most methods for the objective QoE calculation with regards to a communication service are derived from the QoS parameters of a communication network.

Furthermore, no QoS mechanisms exist which depend on a data flow's QoE parameters or QoE information. For example, there is no mechanism to relate the QoE information to the QoS of the network, in order to fine tune or adjust the QoS parameters in response to QoE degradation. More specifically, there are no mechanisms available to relay back the QoE information towards the network without causing scalability and synchronization issues. In order words, there are no mechanisms available to relay back the QoE information in-band with the actual Internet Protocol (IP) traffic.

Embodiments of the present invention provide for a mechanism which couples the QoE information with the traffic flow and overcomes the above drawbacks. More specifically, they provide for a method which relays back the QoE information from the end-user to the network, in a feedback loop. To do so, the QoE information, calculated at the end-user side, is encoded in a data packet header and sent back to the network using, e.g., the Congestion Exposure (ConEx) protocol, as will be described hereinbelow.

An application flow has a measurable QoE as perceived by the end-user. The end-user perceived QoE can be measured in many ways. As an example of QoE measurements, the Voice over Internet Protocol (VoIP) E-Model QoE measurement will be described in this disclosure. The E-Model is a standard objective method to measure and calculate the quality perceived by the end user of a VoIP telephone call, based on various factors including network delay, packet loss, jitter, etc. The measured quality given by the E-model results in the R-factor. The R-Factor scales from 0 to 100. Also, there is a direct mapping between the R-Factor and the Mean Opinion Score (MOS), as shown in Table 1 below. Of note, the rest of the disclosure refers to the MOS or R-Factor interchangeably.

TABLE 1

E-Model R Factor to MOS conversion

| User Satisfaction | R Factor | MOS |
| --- | --- | --- |
| Very satisfied | 90-100 (max 93 with G.711) | 4.3-5.0 (4.4 is the max with G.711) |
| Satisfied | 80-90 | 4.0-4.3 |
| Some users satisfied | 70-80 | 3.6-4.0 |
| Many users dissatisfied | 60-70 | 3.1-3.6 |
| Almost all users dissatisfied | 50-60 | 2.6-3.1 |
| Not Recommended | <50 | 1.0-2.6 |

Reference is now made to FIG. 1, which illustrates a communication system 10 between at least two end-users. The two end-users have devices 12A and 12B respectively, such as computers, laptops, mobile phones, etc., connected to a network 14. The device 12A can be a server as well. The network 14 includes different routers, such as edge routers 16A and 16B and a core router 18. The network 14 may also comprise access routers, which are not shown in FIG. 1. The edge routers 16A and 16B are located at the edge or boundary of the network 14, which can be, for example, an Internet Service Provider (ISP) network. They ensure the connectivity of the network 14 with external networks, such as the Internet. It should be noted that the number of edge routers 16A and 16B or core router 18 is only exemplary in FIG. 1. The communication system 10 further comprises a MOS calculator 20, or any QoE calculator. It should be noted that the MOS calculator 20 or the QoE calculator can be replaced by one or more packet processing engines at the access network for calculating the QoE information. The communication system 10 may also include other elements (not shown) which are well-known in the art.

The MOS calculator 20 or the QoE calculator can be optionally located in the end-user device 12B or in an external box (such as a packet processor), connected to the end-user device 12B. The MOS calculator 20, if external, may have write access to the header of the packets passing therethrough. It is assumed that the MOS calculator 20 can mark information into the packets' header, either by the end-user device 12B or the external packet processor. In the same manner, a MOS calculator (not shown) can be located in the end-user device 12A. The MOS calculator 20 or the QoE calculator includes a communication interface and a processor operationally connected thereto. The communication interface allows for receiving data packets belonging to an application flow. The processor is configured to calculate the QoE information based on the received data packets. Furthermore, the communication interface sends the calculated QoE information back to the communication network.

As an example, the two end-users communicate with each other via a VoIP telephone call using their computers 12A and 12B. The end-user device 12A sends data packets to the end-user device 12B. After the end-user device 12B receives the packets, the MOS calculator 20 can then determine a MOS measurement for this call or communication session, from the perspective of the end-user device 12B. More specifically, the MOS calculator 20 can calculate a MOS measurement (or QoE information) for each data or application flow of the communication session.

In order to maintain the QoE at an acceptable level or to enhance the QoE for the subsequent data packets of this communication session, the QoE information measured and calculated by the MOS calculator 20 is fed back in-band to the network 14, as shown in FIG. 1. To do so, the QoE information is sent back to the end-user device 12A or any other network nodes in the network 14 in a data packet or in an acknowledgement (ACK) packet, for example. The QoE information is encoded in the packet and the ConEx protocol can be used for relaying back the QoE information encoded in the packet to the network 14 and the end-user device 12A.

After the end-user device 12A receives the QoE information reporting the QoE experienced by the previously sent packets, the device 12A inserts the QoE information into the next data packets to be sent out to the network 14. Any node in the network 14, being configured to perform the embodiments of the present invention, can then tune or adjust the QoS in the network 14, based on the received QoE information, in order to enhance the QoE. Different QoS mechanisms can be used for dynamically tuning or adjusting the QoS in the network 14 in response to the QoE information.

Figure 2:
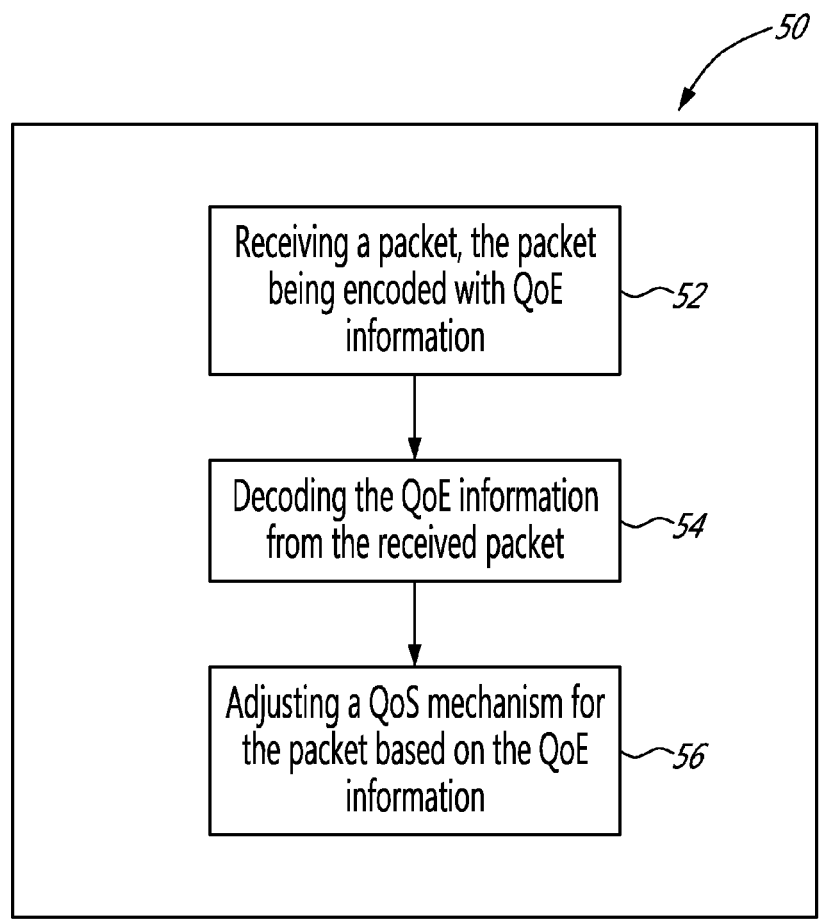
FIG. 2 is a flow chart illustrating a method of enhancing the QoE associated with an application flow of a communication session, according to an embodiment of the present invention.

Turning now to FIG. 2, a method 50 of enhancing QoE of a communication session for an end-user in the communication system 10 will be described. The QoE is associated with an application flow of the communication session.

Method 50 starts with step 52 in which a data packet of the application flow is received. For example, a communication interface of a network node, such as an access router can receive the data packet. The data packet is encoded with QoE information determined based on previous data packets exchanged within the application flow. The MOS calculator 20 could have been used to determine this QoE information, for example.

Upon receiving the data packet, the QoE information is decoded from the data packet, in step 54. More specifically, the QoE information is extracted from the header of the data packet and the value of the QoE information is read and processed.

Based on the decoded QoE information, a QoS mechanism is adjusted, if needed, for the data packet in order to enhance the QoE of the application flow, in step 56. The adjustment of the QoS mechanism can be, for example, upgrading the data packet to a queue having a higher priority, in the context of Active Queue Management (AQM). A person skilled in the art would appreciate that other mechanisms for enhancing QoS parameters can be used. For example, this approach of feeding back, in the network 14, the QoE information, determined based on previously sent data packets, can be used not only in the Active Queue Management (AQM), but also in admission control or any other traffic engineering mechanisms.

As well-known in the art, a packet, such as an Internet Protocol (IP) packet, comprises a header and a payload. By encoding the packet with the QoE information, i.e. by inserting the QoE information in the header of the packet, the payload of the packet can still be used to carry application or useful data information. Thus, no additional or special signaling is needed in the network 14 for carrying the QoE information.

Also, it should be noted that different variants exist for encoding the QoE information. For example, the QoE information could be separated into different parts and encoded into different packets of the application flow. In this case, the network node or the end-use device 12A receiving the packets, needs to keep the states of the application flow in order to maintain the sequence of the different packets with the different parts of the QoE information encoded therein. A person skilled in the art would appreciate that other variants for encoding the QoE information into different packets may also be used.

Figure 3:
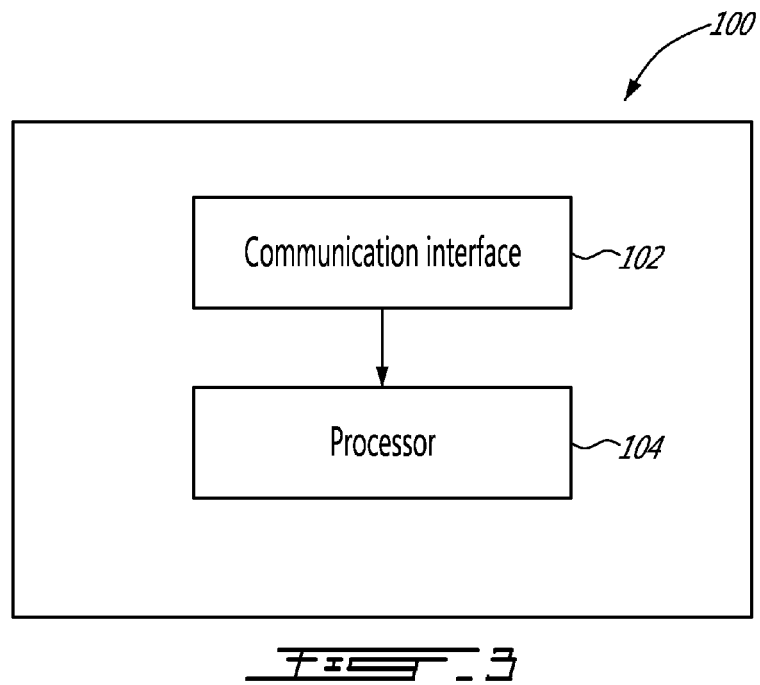
FIG. 3 is a schematic diagram of a network node for carrying the method of FIG. 2, according to an embodiment of the present invention.

Now, with reference to FIG. 3, a network node for enhancing QoE associated with an application flow of a communication session, for an end-user in the communication system 10, will be described. The network node 100 can be a core router, an access router, an edge router, etc.

The network node 100 comprises a communication interface 102 for receiving a data packet belonging to the application flow. The received data packet is encoded with the QoE information determined based on the previous packets belonging to the application flow. For example, the MOS calculator 20 could have determined the QoE information based on the packets of the application flow previously sent to the end-user device 12B by the end-user device 12A. Then, the QoE information is sent back to the end-user device 12A in a data or acknowledgement packet. After receiving the QoE information, the end-user device 12A encodes the QoE information in the next packet of the application flow to be sent out in the network 14.

The network node also comprises a processor 104 which is operationally connected to the communication interface and one or more memories (not shown). The processor 104 is configured to decode the QoE information from the received packet and adjust a QoS mechanism for the packet based on the decoded QoE information, in order to enhance the QoE associated with the application flow. The processor 104 decodes the QoE information by parsing the header of the packet and extracting the QoE information. For example, if the decoded QoE information indicates a low MOS value, i.e. a degraded MOS value or a MOS value that is lower than a threshold MOS value, the processor 104 can dynamically enhance the QoS for this packet of the application flow. To do so, the packet can be assigned or upgraded to a higher priority queue, in the context of AQM, for example.

The network node 100 may also comprise a plurality of other components (not shown), such as additional processors and/or memories, for performing tasks and procedures of the present invention and other usual tasks and procedures well-known in the art.

It should be noted that the QoE information can be provided in different encodings and formats within a packet when being fed-back from the end-user device 12B to the end-user device 12A, and from the end-user device 12A to the network 14.

For example, the QoE information can be a plain QoE value. In this case, each packet can carry the most recent QoE information value associated with the application flow. In the context of a VoIP call, the format can be the MOS value (see Table 1). It should be noted that other applications, such as video, web browsing, gaming, etc., have their own QoE representation formats, either standardized or as proposed to the standards, mostly by International Telecommunication Union—Telecommunication Standardization Sector (ITU-T).

The QoE information may be provided as a QoE Variation. In this format, the QoE variation is calculated for a sample window of two to many packets, forming the QoE time interval. The value of the QoE variance can be positive or negative, meaning an improvement or degradation in the QoE.

The QoE information may be a Speed of Variation. In this format, various mathematical functions can be used to represent the speed at which the QoE changes or evolves. As such, the speed of variation could carry insight in how the QoE is fluctuating during the application flow's lifetime. The mathematical functions are well-known in the art and thus will not be described herein. While the variation format shows the variability of the QoE with respect to a previous time, the speed of variation shows the rate or variance tendency.

Finally, the QoE information can take the form of an indication to signal or convey QoE degradation with the need for enhancing the QoS. For example, a single bit can be used for providing this indication. When this bit is set in a packet, the routers or network nodes receiving that packet will adjust a QoS mechanism (if possible) in order to enhance the QoE. Furthermore, various levels, e.g. urgent, medium, low, can be defined for the single bit, for indicating a need of QoE enhancement.

Now, the feedback mechanism for returning the QoE information from the end-user device 12B to the end-user device 12A and from the end-user device 12A to the network 14, will be described. Different feedback protocols can be used for relaying the QoE information back in the network 14.

A) ConEx Based QoE Feedback

The Congestion Exposure (ConEx) is an experimental protocol defined by the Internet Engineering Task Force (IETF), to allow a sender to inform the network about congestion encountered by previously sent packets of the same flow, along the network path between the sender and the receiver. This protocol is currently defined for the Transmission Control Protocol (TCP) and Explicit Congestion Notification (ECN) feedback, for re-sending the ECN information received by the previous packets. The TCP based ConEx protocol is called Re-ECN.

For example, when using ECN for routers experiencing congestion, the routers mark packets selectively instead of dropping them, using known queuing techniques, such as random early detection (RED). Upon reception of the marked packets, the receiver witnessing the markings, relays this information back to the sender using a transport protocol specific mechanism, such as TCP. Upon reception of the ECN marked packets, a well-behaved and ECN enabled sender will throttle itself to alleviate the network congestion by adjusting its send window. When using ECN, no packets need to be dropped during congestion. ECN uses the last two remaining bits in the outdated type of service (TOS) field of the IPv4 packet header to indicate if ECN is supported or not by the end-nodes and to mark packets during congestion.

ConEx extends ECN with the aim of 1) providing a mechanism for routers to know how much congestion is expected downstream (between the router and the receiver) and 2) providing accountability of senders that take part in congested routes. More precisely, ConEx works as in the following. The routers mark packets when experiencing congestion. The routers can estimate how much congestion a packet will experience downstream by subtracting the rate at which they mark packets from the rate of marked packets they received for a given application flow. This information represents the accountability of a sender with regards to the congestion caused.

Using Re-ECN, upon receiving congestion feedback, a sender not only adjusts its sending behaviour (through ECN) but also feeds back the congestion feedback towards the network in the subsequent packets sent to the network.

However, according to an embodiment of the present invention, the ConEx protocol can be used for carrying the QoE information. For example, the existing ConEx feedback option can be used to "signal" in-band the need for QoE enhancements, i.e. to adjust the QoS for subsequent packets of the same application flow.

The ConEx and Re-ECN implementations can be deployed using Internet Protocol version 4 (IPv4). In this case, the only format available is the QoE format given by the single bit signalling. This is so, because IPv4 Re-ECN has only one bit available to signal the ECN feedback. Therefore, this bit can be used to carry QoE information as an indication to enhance the QoE, instead of the ECN feedback.

The ConEx and Re-ECN implementations can be also deployed using Internet Protocol version 6 (IPv6). In this case, the QoE information can be inserted or piggybacked on an IPv6 ConEx packet using the header of such a packet, for example.

The header of an IPv6 packet has a fixed size of 40 bytes. However, options can be implemented as additional extension headers or option headers after the IPv6 header. More specifically, the option headers are placed between the IPv6 header and the Transport layer header. The different types of option headers or header extensions for the IPv6 packet include: a Routing header, Destination Option header, and Hop-by-Hop Option header.

IETF has been made the destination option header available for IPv6 ConEx. The destination option header is reserved for IPv6 ConEx to carry the re-ECN feedback, as shown below (see the ConEx Destination Option Layout). More specifically, the ConEx destination option header provide a 32-bit field from which four bits are currently specified for ConEx, such as bits X, L, E and C. The remaining 28 bits are reserved for future use, as shown below. It is therefore possible to use these 28 reserved bits as a feedback mechanism from the receiver to the sender, as a request mechanism for QoE enhancement from the sender to the routers and to define the QoE information in different formats and encodings.

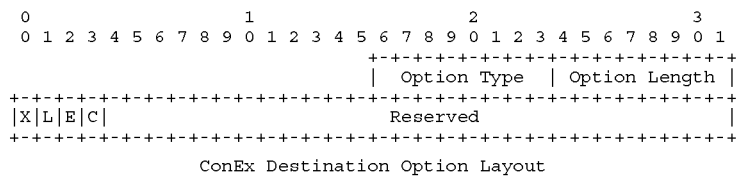

ConEx Destination Option Layout

As an example, the different fields of the destination option as shown below provide an exemplary encoding for carrying the QoE feedback information using the reserved bits.

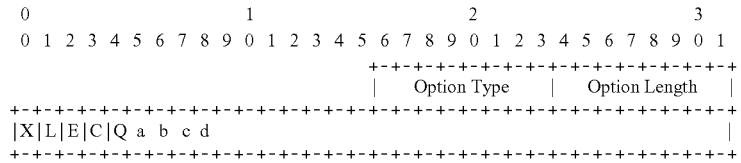

```
 0                   1                   2                   3
 0 1 2 3 4 5 6 7 8 9 0 1 2 3 4 5 6 7 8 9 0 1 2 3 4 5 6 7 8 9 0 1
                +-+-+-+-+-+-+-+-+-+-+-+-+-+-+-+-+
                |  Option Type  | Option Length |
+-+-+-+-+-+-+-+-+-+-+-+-+-+-+-+-+-+-+-+-+-+-+-+-+-+-+-+-+-+-+-+-+
|X|L|E|C|Q a  b  c  d                                           |
+-+-+-+-+-+-+-+-+-+-+-+-+-+-+-+-+-+-+-+-+-+-+-+-+-+-+-+-+-+-+-+-+
```

Five bits (Q, a, b, c and d) are used for indicating encoding types.

Bit Q: this bit is used to indicate if the packet carries QoE information; if this bit is set, the packet then carries QoE feedback information.

Bits a, b and c: these bits are used to identify the type of QoE information being used. For example, the QoE information can be the QoE variation, QoE speed variation, etc.

Bit d: this bit can represent a single-bit signaling where the only information carried in the packet is an indication that the QoE is not good and that QoS enhancement is requested, if possible. If this bit is set, the a, b and c bits would be ignored.

The rest of the bits can be used to carry the QoE information itself based on the type of application.

For example, in VoIP applications, the bits a, b and c can be equal to 000. The next 7 bits represent the R factor (or MOS equivalent). The remaining 16 bits are split in two 8 bits unsigned integer fields to represent the QoE variation and QoE speed of variation.

B) New Protocol for QoE Feedback

It should be noted that, besides the destination option header, it is also possible to define a new type of option header in an IP packet for carrying the QoE feedback information.

Now, turning to FIG. 4, a communication system 150 in which the QoE information feedback is provided by the ConEx protocol will be described. It is assumed that the ConEx protocol is ECN enabled and uses TCP. However, other transport protocols can be used.

Let's assume that the end-user device 12A is the sender. In step 1, the sender sends data packets belonging to a same application flow to the end-user device 12B, which is referred to as the receiver, through the network 14.

In step 2, the routers 16 and 18, along the communication path between the sender and the receiver, can congestion mark the data packets going through them, instead of dropping them, in case of congestion. In this case, ECN is used for indicating the congestion. This step is optional.

In step 3, when the receiver receives the packets, the MOS calculator 20 calculates the QoE information regarding the QoE experienced by the end-user for the data packets belonging to that application flow. Then, the calculated QoE information can be fed back to the network 14 and sent back to the end-user device 12A, in an acknowledgement (ACK) packet or in a data packet. The QoE information is encoded in the packet as described above using the reserved bits. Optionally, in case of congestion, the receiver can also feed back the congestion information to the network 14, regarding the congestion experienced by the received packets when travelling through the network 14.

In step 4, the edge router 16B can act immediately upon receiving the QoE information contained in the packet, the packet coming from the receiver. This step is optional. For example, it can adjust a QoS mechanism based on the received QoE information. To do so, the edge router 16B should be able to keep per flow information in order to relate the received QoE information to the application flow it belongs to. By having the edge router 16B act right away, half of a Round Trip Time (RTT) is saved, as opposed to the case where the QoE information is sent to the end-user device 12A first. In this latter case, the end-user device 12A encodes the received QoE information into the next packets to be sent out to the network 14. When the network nodes of the network 14, such as the edge routers 16A or core router 18, receive the QoE information, they can, then, perform QoS adjustments or enhancements.

In step 5a, upon receiving the packet encoded with the QoE information, the sender re-feeds back the QoE information to the routers in the communication path. The QoE information is encoded in the packets sent to the routers. Using such a QoE information feedback will result in an overall better QoE for the application flow, since the QoE information allows the network 14 to adjust or enhance the QoS if needed, in response to the QoE information.

In step *5b (optional) and for IPv6 only, if ConEX is also ongoing, the sender can also mark the RE-congestion experience in the packets sent to the network 14 by the device 12A to indicate the congestion experience.

Upon receiving the packets with the encoded QoE information, any of the routers 16A, 16B and 18 can decode the QoE information by parsing the header of the packets and extracting the QoE information. Then, the routers can perform a QoS mechanism adjustment based on the decoded QoE information. One example of QoS mechanism adjustments, in the context of AQM, is to upgrade the packet to a better QoS class.

Figure 4:
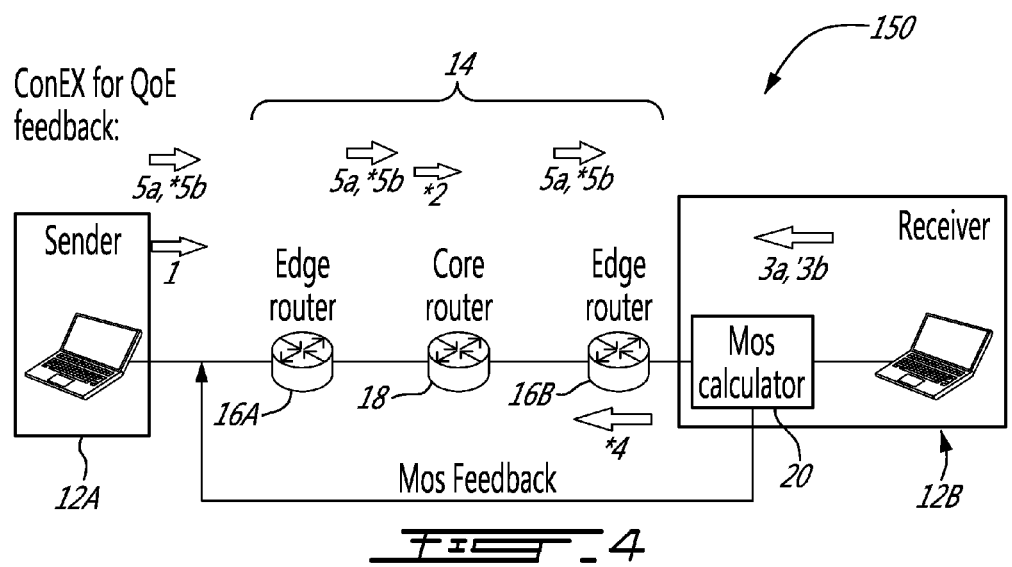
FIG. 4 is a schematic view of a communication network having QoE information feedback using the Congestion Exposure (ConEx) protocol, according to an embodiment of the present invention.

As mentioned with reference to FIG. 4, different network nodes can receive the QoE information and then adjust the QoS mechanism based on the received QoE information. Thus, the embodiments of the present invention regarding the QoE-feedback based QoS mechanism can be implemented in various architectural scenarios, i.e. in different network nodes, as described below.

A: Access Node QoE-Feedback Based QoS:

In this approach, the access router takes the action to adjust the QoS mechanism upon receiving the QoE information. This approach has the benefit of:
  1—treating the congestion problem at its source, as usually the access node is the source of congestion;
  2—keeping the core router 18 un-touched;
  3—staying aligned with the differentiated services (DiffServ) architecture.

B: Core Nodes QoE-Feedback Based QoS:

In this approach, both the access nodes/routers and the core nodes/routers take the action to adjust the QoS mechanism upon receiving the QoE information. This approach may be advantageous as the access and core routers contribute to QoE enhancements when possible and necessary.

Partial Support of QoE-Feedback Based QoS:

As a hybrid between the two above approaches, the partial support approach can be deployed for a gradual integration of the network nodes/routers supporting QoE-feedback QoS mechanisms. This means that not all the routers in the network need to support the QoE-feedback QoS mechanism to enhance QoS based on QoE information. The routers that do not support the QoE-feedback QoS mechanism will ignore the QoE information contained in the header of the packets going through them.

Now, an exemplary implementation of an embodiment of the QoE-feedback based QoS mechanism will be given, in the context of active queue management and scheduling.

The active queue management and scheduling is an example of a QoS mechanism but embodiments of the present invention are not limited to such a mechanism.

The active queue scheduling mechanism includes a dynamic scheduling of packets among several queues based on:
  the QoE-feedback information carried by the packets;
  the current state of the queues; and
  the policies, such as giving priority to the traffic of end-users that pay their subscription fees on time over the traffic of end-users who do not pay their subscription fees on time.

Moreover, this dynamic scheduling can be complemented by existing mechanisms such as DiffServ Code Point (DSCP). In the following example, it is assumed that DSCP is assigned, i.e. the traffic packets are marked with DSCP. It is also assumed that the network is a DiffServ enabled core.

DiffServ operates on the principle of traffic classification. When data traffic enters a DiffServ domain, which comprises a plurality of routers implementing DiffServ policies, the data traffic is classified into different traffic classes. Each traffic class is managed differently, ensuring preferential treatment for higher priority traffic, for example. Different parameters, such as source address, destination address or traffic type can be used to assign the traffic to a specific traffic class. Also, traffic classifiers may be used to respect any DiffServ markings made in the received packets or they may choose to ignore or override those markings Traffic in each class may be further conditioned by subjecting the traffic to rate limiters, traffic policers or shapers, etc.

The different traffic classes in DSCP include Expedited Forwarding (EF), Assured Forwarding (AF1, AF2, AF3 and AF4), Best Effort (BE), etc.

The AF class gives assurance of traffic delivery under prescribed conditions. The prescribed conditions relate to subscribed transmission rates, for example. Within the AF class, 4 sub-classes are defined corresponding to different priorities: AF1, AF2, AF3 and AF4.

The EF class is dedicated to low-loss, low-latency and low jitter traffic. The EF class is suitable for voice, video and real-time services, for example.

The BE class is generally directed to best-effort traffic. However, any traffic that does not meet the requirements of any of the other defined classes are placed in the default BE class.

Figure 5:
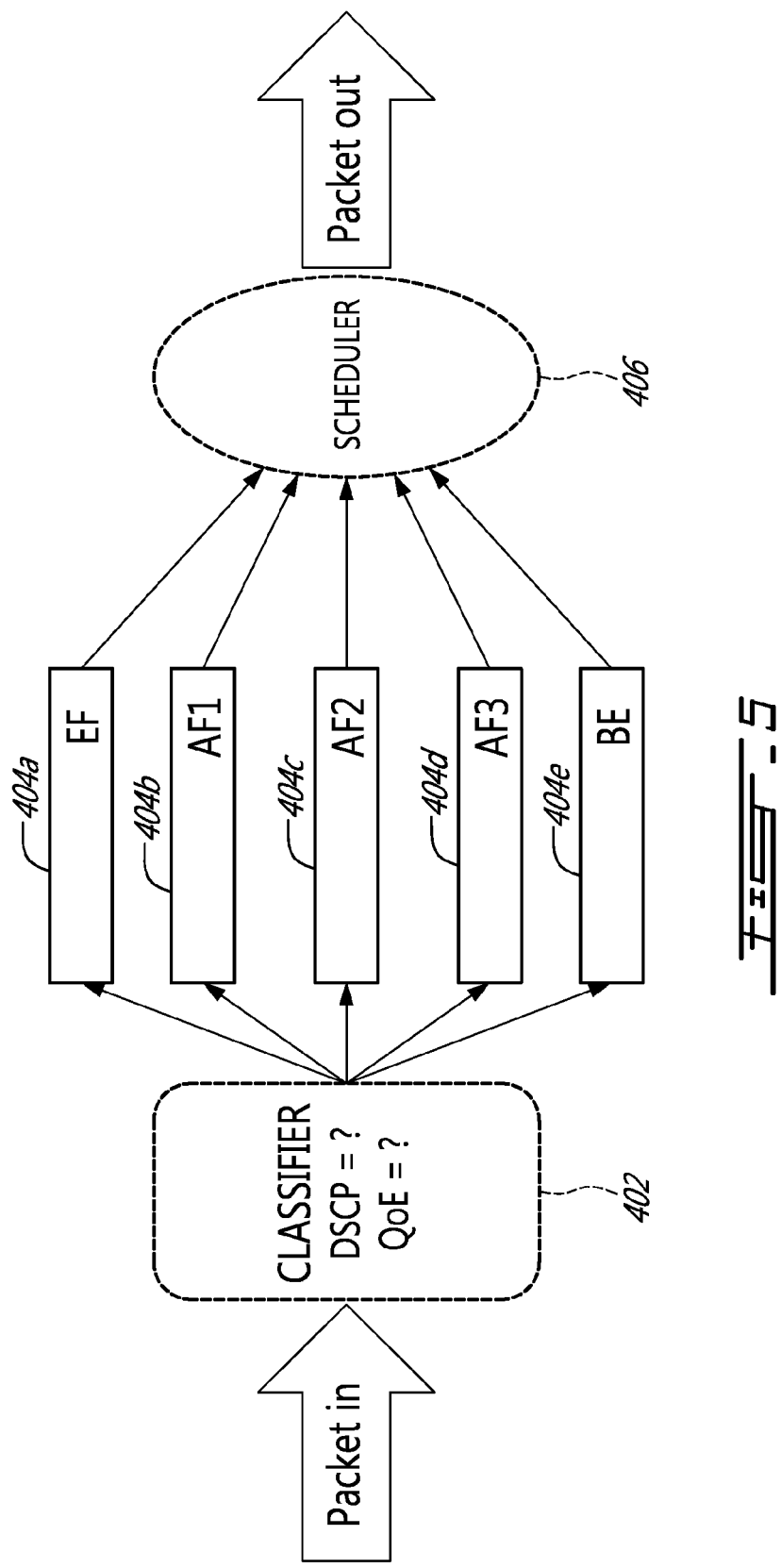
FIG. 5 is a schematic view of a classifier according to an embodiment of the present invention.

FIG. 5 shows a Multi-field DiffServ classifier 402 using QoE information. When a data packet enters the classifier 402, the classifier 402 examines the DSCP and the QoE information contained in the data packet. If QoE information is not required, then the data packet is assigned to the queue associated with its DSCP, for example any of the queues 404a to 404e. If QoE enhancement is required, for example, the QoE value given by the QoE information is lower than a threshold or the variation of the QoE is negative, the classifier 402 can assign the data packet to a higher queue class. To do so, the classifier 402 may consider the overall queue lengths and estimate the gain of such an upgrade, in terms of the overall QoS of the network. It will be appreciated that persons skilled in the art would know how to promote a data packet to a higher queue class. It should be also noted that DSCP is left unchanged, thus allowing the classifier in each network node or router to make such a similar decision.

The scheduler 406 then is used to transmit the data packets according to their assigned queues towards the network 14.

Figure 6:
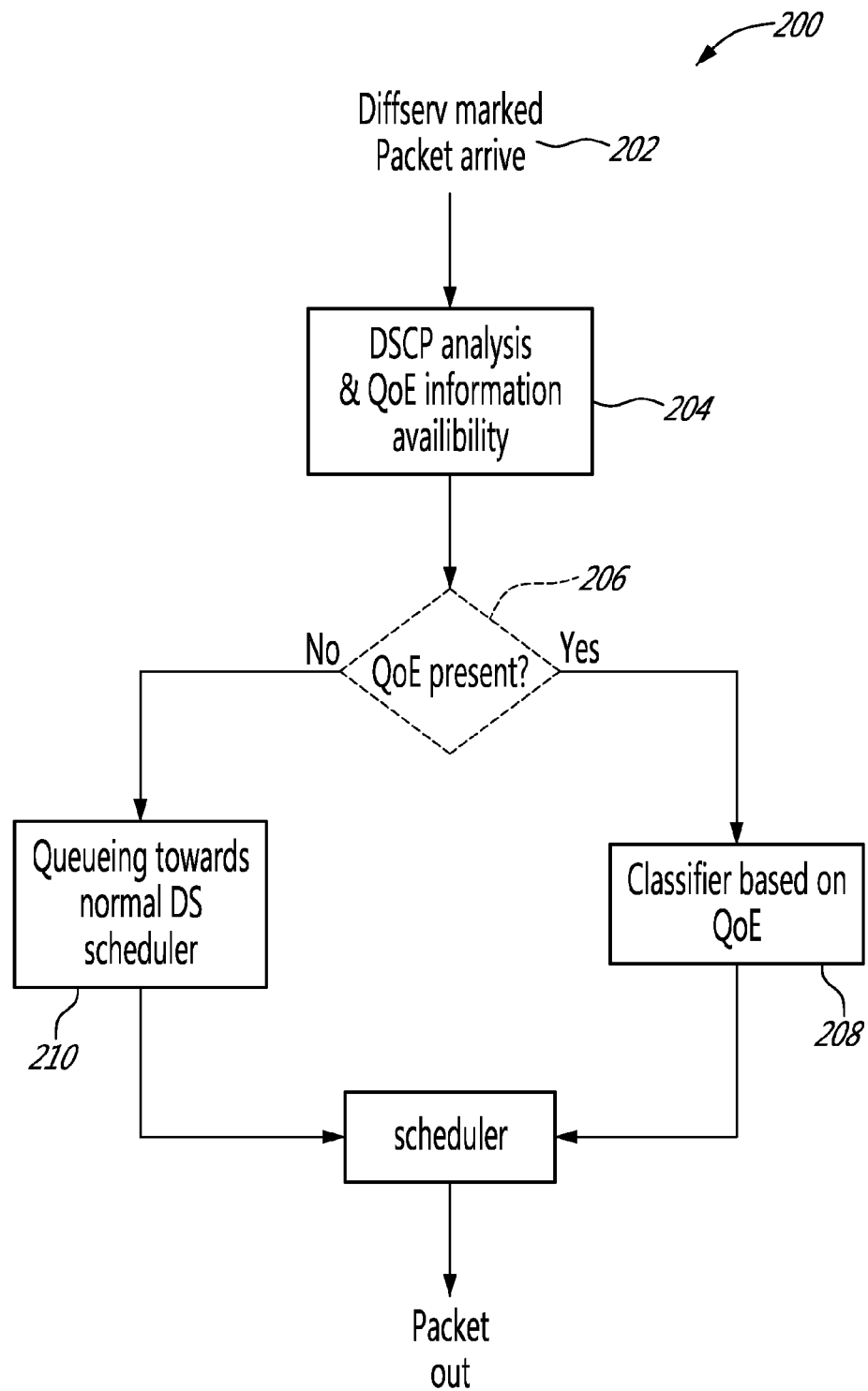
FIG. 6 illustrates an event flow from when a packet enters a network node to when it leaves the network node, according to an embodiment of the present invention.

FIG. 6 shows a general flow of events from when a data packet enters a network node to when it leaves the network node. The network node can be an access node or access router or any other network nodes. For example, after the end-user device 12A has received and encoded the QoE information in a data packet, the data packet is sent to the network node.

The data packet is received in the network node (step 202). It is assumed in this example that the data packet arriving at the network node is Diffserv marked.

After the data packet is received by the network node, the network node extracts and analyzes different fields in the header of the packet, such as Differentiated Services Code Point (DSCP) and QoE information availability (step 204). If the QoE information is present (step 206), for example if the bit Q is set (i.e. Q=1), the packet is directed to the classifier 402 of FIG. 5 (step 208). As mentioned earlier, the classifier 402 of FIG. 5 is used to assign a specific traffic class to the received packets, based on the QoE information and DSCP markings Once the packets have been assigned to their queue, the scheduler 406 can be used to transmit the packets according to their assigned queues towards the network 14.

If the QoE information is not available, for example, the bit Q is not set, the packet is sent to the conventional DiffServ scheduler, or the network node's scheduler (step 210). Furthermore, the scheduler 406 can be used to transmit the packet towards the network 14.

Figure 7:
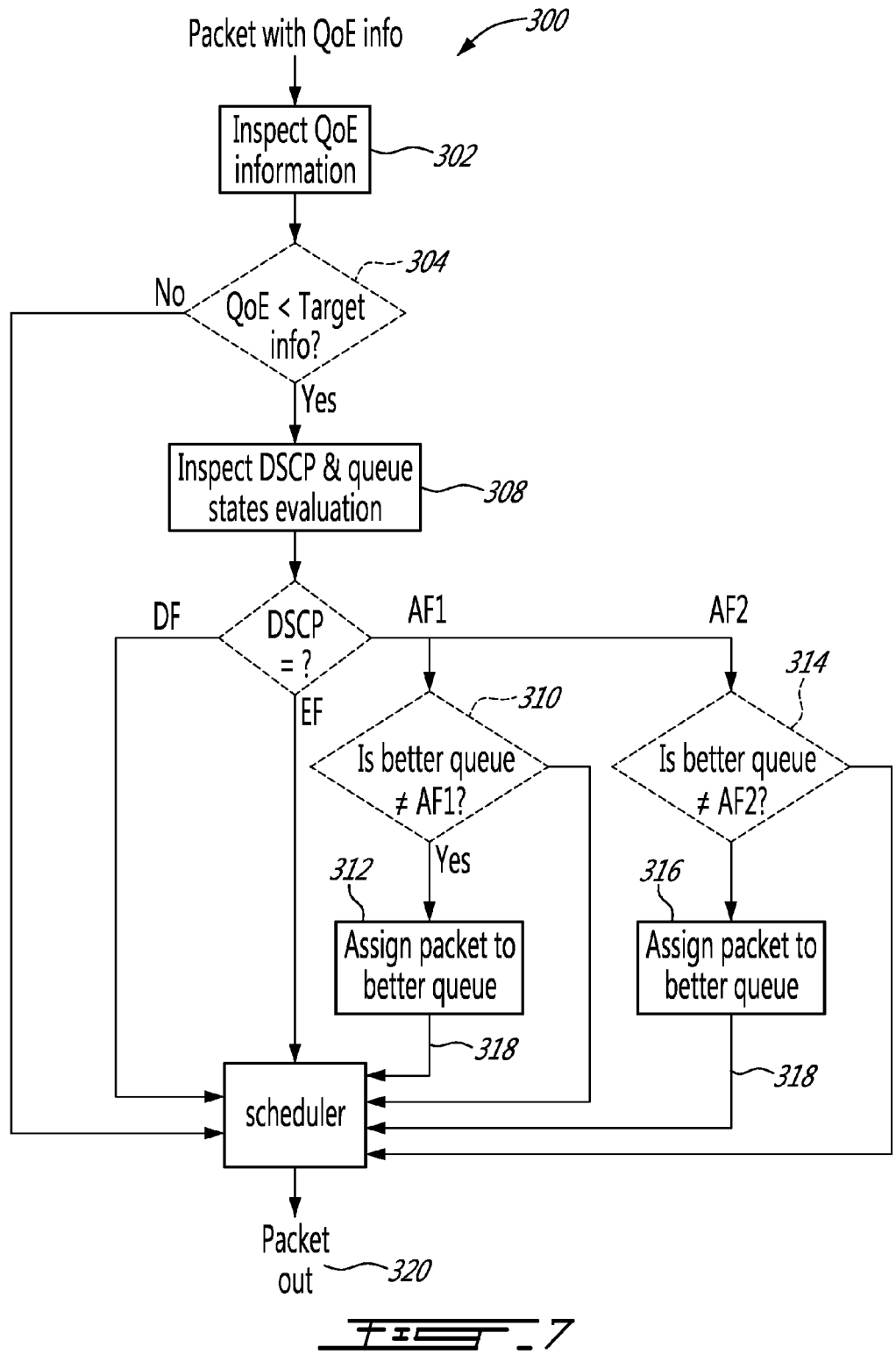
FIG. 7 is a method for classifying data packets based at least on QoE information according to an embodiment of the present invention.

Reference is now made to FIG. 7 in which a method 300 for classifying data packets based on QoE information is illustrated. Method 300 is performed in the classifier 402 of FIG. 5. After the classifier 402 receives the packet (step 208 of FIG. 6), the classifier 402 extracts and inspects the QoE information of the received packet (step 302) in order to determine if QoE enhancements are needed for the packet.

More specifically, in step 304, the extracted QoE information from the received packet is compared to a value of a QoE target or threshold. The QoE target or its value can be set by the network operator or by the end-user. If the value of the QoE information is not inferior to the QoE target value, i.e. the QoE information value is superior or equal to the QoE target value, then the packet is directed towards the scheduler 406 (step 306). In this case, it means that the QoE does not need to be enhanced as the QoE information provided by the packet is as good or higher than the QoE target value.

If the received QoE information is inferior to the value of the QoE target, then the QoE needs to be enhanced. To do so, a QoS mechanism is adjusted and enhanced. In this example, such a QoS mechanism adjustment may comprise upgrading the traffic class of the packet. To do so, first, the DSCP and the states of the different queues are evaluated (step 308).

Depending on the DSCP threshold values and the QoE information value, the packet can be promoted from one queue to another queue. The DSCP threshold values are well-known in the art. For example, if the packet was initially assigned to the class AF1 according to the DSCP markings, but a better queue is needed (step 310) based on the QoE information, then the packet is assigned to a better queue (step 312), such as EF. If the packet was initially assigned to AF2 but a better queue is needed (step 314), then the packet is assigned to a better queue (step 316), such as EF. Next, the packet is sent to the scheduler 406 (step 318). The scheduler 406 sends the packet out to the network 14 according to the assigned queue and conditions of the network (step 320).

Advantages of this method include tuning QoS mechanisms, such as in queue scheduling, to enhance QoE. The QoS tuning is performed based on the QoE information feedback.

Also, the "in-band" nature of the feedback of QoE information allows for avoiding signaling overhead for QoE feedback.

Preemption based scheduling with minimum QoE affectation is one other possible use of the method as illustrated in FIG. 2. By having the information of QoE per flow, the access or core router may apply pre-emption to affect minimally the overall QoE level of the end-users.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of enhancing Quality of Experience (QoE) associated with an application flow for an end-user in a communication network, the method comprising:
receiving a data packet as part of the application flow, at a communication interface of a network node, the data packet comprising a payload containing application data and a header containing QoE information associated with the application flow, the QoE information determined based on previous data packets exchanged within the application flow;
decoding the QoE information from the header of the received data packet by a processor of the network node;
adjusting a QoS mechanism for the received data packet of the application flow, based on the decoded QoE information for enhancing the QoE associated with the application flow; and
sending the data packet to another network node in the communication network, according to the adjusted QoS mechanism.

2. The method of claim 1, wherein the QoE information determined based on the previous data packets is determined by a Mean Opinion Score (MOS) calculator for Voice over IP applications.

3. The method of claim 1, wherein the QoE information is encoded in the header of the received data packet.

4. The method of claim 3, wherein receiving the data packet comprising receiving the data packet using Congestion Exposure (ConEx) protocol over Internet Protocol version 4 (IPv4) and wherein the QoE information is encoded in the header of the data packet, using a single available bit.

5. The method of claim 3, wherein receiving the data packet comprises receiving the data packet using a Congestion Exposure (ConEx) protocol over Internet Protocol version 6 (IPv6) and wherein the QoE information is encoded in an extension header of the data packet.

6. The method of claim 1, wherein the QoE information is one of a QoE value, a QoE variation, a QoE speed variation and a QoE single-bit signaling.

7. The method of claim 1, wherein decoding comprising parsing the header of the received data packet and extracting the QoE information.

8. The method of claim 1, wherein adjusting a QoS mechanism comprises comparing the decoded QoE information with a QoE target value.

9. The method of claim 1, wherein adjusting a QoS mechanism comprises upgrading the data packet to a higher priority queue in active queue management if the decoded QoE information is inferior to a QoE target value.

10. A network node for enhancing Quality of Experience (QoE) associated with an application flow for an end-user in a communication network, the network node comprising:
a communication interface for receiving a data packet as part of the application flow, the data packet comprising a payload containing application data and a header containing QoE information associated with the application flow, the QoE information determined based on previous data packets exchanged within the application flow; and
a processor operationally connected to the communication interface and configured to:
decode the QoE information from the received data packet;
adjust a QoS mechanism for the received data packet of the application flow, based on the decoded QoE information for enhancing the QoE associated with the application flow; and
send the data packet to another network node in the communication network according to the adjusted QoS mechanism.

11. The network node of claim 10, wherein the QoE information determined based on the previous data packets is determined by a Mean Opinion Score (MOS) calculator for Voice over IP applications.

12. The network node of claim 10, wherein the QoE information is encoded in the header of the received data packet.

13. The network node of claim 12, wherein the communication interface receives an IPv4 packet using Congestion Exposure (ConEx) protocol and the QoE information is encoded in the header of the data packet, using a single available bit.

14. The network node of claim 12, wherein the communication interface receives an IPv6 packet using Congestion Exposure (ConEx) protocol and the QoE information is encoded in an extension header of the data packet.

15. The network node of claim 10, wherein the QoE information is one of a QoE value, QoE variation, QoE speed variation and QoE single-bit signaling.

16. The network node of claim 12, wherein the processor decodes the QoE information by parsing the header of the received data packet and extracting the QoE information.

17. The network node of claim 12, wherein the processor compares the decoded QoE information with a QoE target value.

18. The network node of claim 10, wherein the processor adjusts the QoS mechanism by upgrading the data packet to a higher priority queue in active queue management, if the decoded QoE information is inferior to a QoE target value.

19. A method for a user device for relaying Quality of Experience (QoE) associated with an application flow between the user device and a second user device in a communication network, the method comprising:
- receiving from the second user device a data packet as part of the application flow, the data packet comprising a payload containing application data and a header containing QoE information associated with the application flow, the QoE information determined based on previous data packets exchanged within the application flow;
- decoding the QoE information from the received data packet; and
- sending one or more next data packets with the QoE information decoded to the second user device, the one or more next data packets each including a payload containing application data and a header containing the decoded QoE information associated with the application flow.

20. The method of claim 19, wherein the QoE information is determined by a Mean Opinion Score (MOS) calculator for Voice over IP applications.

21. A user device for relaying Quality of Experience (QoE) associated with an application flow between the user device and a second user device in a communication network, the user device comprising:
- a communication interface for receiving from the second user device a data packet as part of the application flow, the data packet comprising a payload containing application data and a header containing QoE information associated with the application flow, the QoE information determined based on previous data packets exchanged within the application flow; and
- a processor operationally connected to the communication interface for decoding the QoE information from the received data packets;
- the communication interface further for sending one or more next data packets with the QoE information decoded to the second user device, the one or more next data packets each including a payload containing application data and a header containing the decoded QoE information associated with the application flow.

22. The user device of claim 21, wherein the QoE information is determined by a Mean Opinion Score (MOS) calculator for Voice over IP applications.

\* \* \* \* \*